US012725216B1

(12) United States Patent
Selman et al.

(10) Patent No.: US 12,725,216 B1
(45) Date of Patent: Sep. 1, 2026

(54) COUNTERPARTY PROFILE FOR AN ELECTRONIC AGREEMENT

(71) Applicant: DocuSign, Inc., San Francisco, CA (US)

(72) Inventors: Daniel Charles Selman, Winchester (GB); Yiting Zheng, Chicago, IL (US); Mariam Badiei Turner, Charlotte, NC (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 18/820,054

(22) Filed: Aug. 29, 2024

(51) Int. Cl.
*G06Q 30/00* (2023.01)
*G06Q 50/18* (2012.01)

(52) U.S. Cl.
CPC .................................. *G06Q 50/188* (2013.01)

(58) Field of Classification Search
None
See application file for complete search history.

(56) References Cited

U.S. PATENT DOCUMENTS

| | | | | |
|---|---|---|---|---|
| 7,734,507 | B2 | 6/2010 | Ritter | |
| 2012/0023006 | A1* | 1/2012 | Roser | G06Q 40/03 706/12 |
| 2015/0199411 | A1* | 7/2015 | Greenspan | G06F 40/197 715/764 |
| 2018/0260378 | A1* | 9/2018 | Theodore | G06F 16/93 |
| 2019/0386833 | A1* | 12/2019 | Alger | H04L 9/3239 |
| 2020/0250753 | A1* | 8/2020 | Blount | G06Q 20/405 |
| 2020/0327151 | A1* | 10/2020 | Coquard | G06F 16/3347 |
| 2021/0366065 | A1 | 11/2021 | Zhou et al. | |
| 2022/0058287 | A1* | 2/2022 | Hirson | G06F 21/316 |
| 2022/0100955 | A1 | 3/2022 | Law et al. | |

(Continued)

FOREIGN PATENT DOCUMENTS

| | | | |
|---|---|---|---|
| CN | 109447105 | A | 3/2019 |
| CN | 117114006 | A | 11/2023 |

OTHER PUBLICATIONS

E. Ash, J. Jacobs, B. Macleod, S. Naidu and D. Stammbach, "Unsupervised Extraction of Workplace Rights and Duties from Collective Bargaining Agreements," 2020 International Conference on Data Mining Workshops (ICDMW), Sorrento, Italy, 2020 ( Year: 2020).*

(Continued)

*Primary Examiner* — Matthew T Sittner
(74) *Attorney, Agent, or Firm* — Shumaker & Sieffert, P.A.

(57) ABSTRACT

A system for generating counterparty profiles for electronic agreements, based on an indication of a change to a pending clause of an electronic agreement, may determine, based on a second entity, a first historical document and a second historical document. The system may correlate the pending clause of the electronic agreement with a first clause of a plurality of first clauses of the first historical document and with a second clause of a plurality of second clauses of the second historical document based on first content of the first clause and second content of the second clause. Based on the correlation, the system may generate difference information between the first content of the first clause and the second content of the second clause. The system may generate a counterparty profile for the second entity based on the difference information.

20 Claims, 6 Drawing Sheets

(56) References Cited

U.S. PATENT DOCUMENTS

| | | | | |
|---|---|---|---|---|
| 2022/0138690 | A1* | 5/2022 | Anjum | G06F 40/131 705/80 |
| 2022/0188371 | A1* | 6/2022 | Kaza | G06Q 10/10 |
| 2022/0269884 | A1* | 8/2022 | Walters | G06F 40/166 |
| 2022/0318489 | A1* | 10/2022 | Gurenkov | G06F 40/197 |
| 2022/0405503 | A1* | 12/2022 | Kaza | G06V 10/774 |
| 2023/0126497 | A1* | 4/2023 | Tkachuk | G06F 9/542 707/608 |
| 2023/0297604 | A1 | 9/2023 | Berger et al. | |

OTHER PUBLICATIONS

S. Purohit, G. Chin, P. S. Mackey and J. A. Cottam, "GraphAide: Advanced Graph-Assisted Query and Reasoning System," 2024 IEEE International Conference on Big Data (BigData), Washington, DC, USA, 2024 (Year: 2024).*

Lewandowski, "How to use machine learning for customer segmentation", Whites Agency, 6 pp., Retrieved from the Internet on Dec. 29, 2025 from URL: https://whites.agency/blog/how-to-use-machine-learning-for-customer-segmentation/.

Castillo, "How to Cluster Documents Using Word2Vec and K-means", Jan. 18, 2021, 11 pp., URL: https://dylancastillo.co/posts/nlp-snippets-cluster-documents-using-word2vec.html.

U.S. Appl. No. 18/790,997, filed Jul. 31, 2024, naming inventors Zheng et al.

U.S. Appl. No. 18/933,606, filed Oct. 31, 2024, naming inventors Selman et al.

* cited by examiner

COUNTERPARTY PROFILE FOR AN ELECTRONIC AGREEMENT

TECHNICAL FIELD

This disclosure relates generally to electronic document management.

BACKGROUND

Electronic document management allows for agreements to be electronically executed. For example, two parties may propose changes to an electronic agreement, and when the electronic agreement is acceptable, both parties may electronically sign the electronic agreement.

SUMMARY

A document management system may be configured to provide insights about a pending clause of an electronic agreement being negotiated. For example, the document management system may generate information indicating whether the pending clause is compliant with a set of rules for an entity (e.g., a "playbook" for the entity). The document management system may output the information indicating whether the pending clause is compliant with a set of rules for an entity. For example, the document management system may cause a user device associated with an entity to display the pending clause with an indicator (e.g., a green light or thumbs up icon) noting that the pending clause is compliant with a playbook for the entity. In this way, the document management system may provide helpful information to support generation of the executed electronic agreement that finalizes the negotiation between the entity and a counterparty.

In accordance with the techniques of the disclosure, a document management system configured for use in the field of electronic document generation and management may be improved by, for example, proactively generating and providing insights from a counterparty profile in real-time. For example, the document management system itself may generate a counterparty profile from historical documents during negotiations. For instance, the document management system may determine historical documents for a first entity and a second entity (e.g., the counterparty) based on a change to a pending clause of an electronic agreement being negotiated between the first entity and the second entity. In this instance, the document management system may correlate (e.g., using vector embeddings) the pending clause with clauses of the historical documents.

The document management system may generate, based on the correlation, difference information between content of clauses of the historical documents. For example, the document management system may determine a success count and a failure count for each value in an attribute in the pending clause. For instance, the document management system may determine that the second entity signed thirty contracts with a first type of Force Majeure clause and refused to sign 15 contracts with the first type of Force Majeure clause and that the second entity signed 100 contracts with a second type of Force Majeure clause and refused to sign 2 contracts with the second type of Force Majeure clause. In this example, the document management system may generate the counterparty profile for the second entity based on the difference information. For example, the document management system may generate the counterparty profile for the second entity to indicate a standard position and one or more fallback positions for the second entity. For instance, the document management system may generate the counterparty profile for the second entity to indicate the standard position for the second entity is the second Force Majeure clause and a fallback position for the second entity is the first Force Majeure clause. The document management system may output, e.g., to a computing device associated with the first entity, an indication of the counterparty profile for the second entity. For example, the document management system may cause the computing device associated with the first entity to display content of the pending clause with an indication that the pending clause is a fallback position of the counterparty and/or a suggestion to propose the standard position of the counterparty along with respective expected times to execution for the standard and fallback position of the counterparty. In this way, the document management system may proactively provide richer information to support generation of the executed electronic agreement that finalizes the negotiation between the first entity and the second entity (e.g., the counterparty) than systems that do not generate a counterparty profile (e.g., systems that rely only on a playbook).

The techniques described herein may provide one or more technical advantages that realize one or more practical applications. For example, proactively generating the counterparty profile and/or outputting the indication of the counterparty profile to a computing device may improve an efficiency of the document management system by, e.g., reducing a number of versions of an electronic agreement managed by the document management system and/or reducing a time to negotiate the electronic agreement, which may reduce an amount of computational burden on the document management system, reduce an amount of power consumed by the document management system, reduce an amount of data transmitted and/or received by the document management system, and/or reduce a memory usage of the document management system.

In one example, a system comprises processing circuitry and computer readable media comprising instructions that, when executed, cause the processing circuitry to, based on an indication of a change to a pending clause of an electronic agreement being negotiated between a first entity and a second entity, determine, based on the second entity, a first historical document and a second historical document. The instructions further cause the processing circuitry to correlate the pending clause of the electronic agreement with a first clause of a plurality of first clauses of the first historical document and with a second clause of a plurality of second clauses of the second historical document based on first content of the first clause and second content of the second clause. The instructions further cause the processing circuitry to, based on the correlation, generate difference information between the first content of the first clause and the second content of the second clause and generate a counterparty profile for the second entity based on the difference information. The instructions further cause the processing circuitry to output an indication of the counterparty profile for the second entity.

In another example, a method may include, based on an indication of a change to a pending clause of an electronic agreement being negotiated between a first entity and a second entity, determining, by processing circuitry and based on the second entity, a first historical document and a second historical document. The method further includes correlating, by the processing circuitry, the pending clause of the electronic agreement with a first clause of a plurality of first clauses of the first historical document and with a second clause of a plurality of second clauses of the second historical document based on first content of the first clause and second content of the second clause. The method further includes, based on the correlating, generating, by the processing circuitry, difference information between the first content of the first clause and the second content of the second clause. The method further includes generating, by the processing circuitry, a counterparty profile for the second entity based on the difference information and outputting, by the processing circuitry, an indication of the counterparty profile for the second entity.

In one example, computer-readable storage media encoded with instructions that, when executed, causes processing circuitry of a computing system to, based on an indication of a change to a pending clause of an electronic agreement being negotiated between a first entity and a second entity, determine, based on the second entity, a first historical document and a second historical document. The instructions further cause the processing circuitry to correlate the pending clause of the electronic agreement with a first clause of a plurality of first clauses of the first historical document and with a second clause of a plurality of second clauses of the second historical document based on first content of the first clause and second content of the second clause. The instructions further cause the processing circuitry to, based on the correlation, generate difference information between the first content of the first clause and the second content of the second clause. The instructions further cause the processing circuitry to generate a counterparty profile for the second entity based on the difference information and output an indication of the counterparty profile for the second entity.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

Like reference characters denote like elements throughout the text and figures.

DETAILED DESCRIPTION

Figure 1:
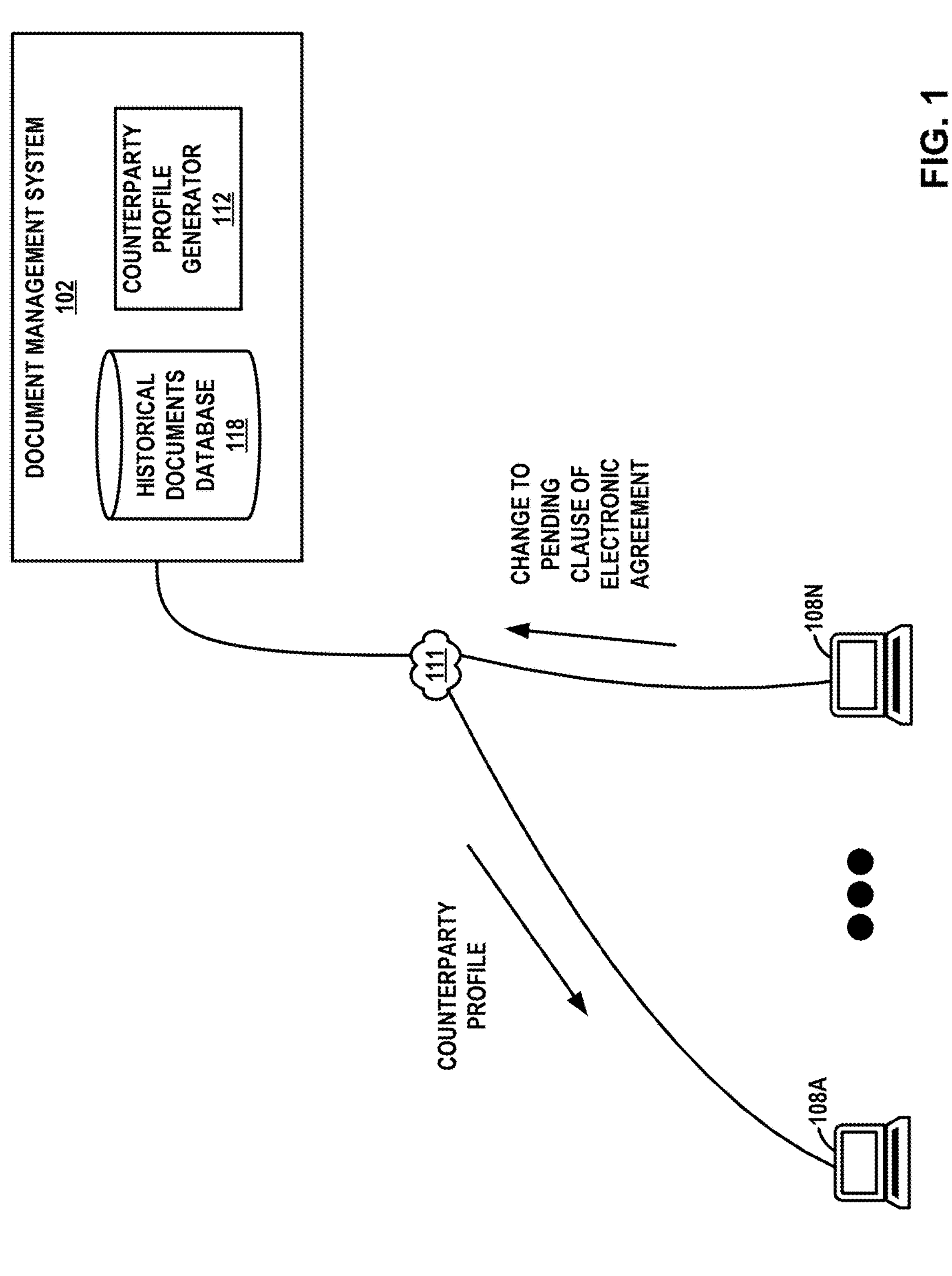
FIG. 1 is a block diagram illustrating an example computing environment for generating a counterparty profile for an electronic agreement, in accordance with the techniques of this disclosure.

FIG. 1 is a block diagram illustrating an example computing environment 100 for generating a counterparty profile for an electronic agreement, in accordance with the techniques of this disclosure. In the example of FIG. 1, computing environment 100 includes document management system 102, user devices 108A-108N (collectively referred to herein as, "user devices 108"), and network 111.

Document management system 102 may provide generation and management of documents or document packages for users associated with user devices 108. In the example of FIG. 1, document management system 102 includes historical documents database 116 and counterparty profile generator 112 (also referred to herein as simply "generator 112"). Document management system 102 may include a collection of hardware devices, software components, and/or data stores that can be used to implement one or more applications or services provided to user devices 108 via network 111. In some examples, document management system102 may represent a cloud computing system that provides one or more services via a network. That is, in some examples, document management system 102 may be a distributed computing system.

Document management system 102 may allow user devices 108 to access documents, via network 111 using a communication protocol, as if such document was stored locally (e.g., to a hard disk of a corresponding user devices 108). Example communication protocols for accessing documents and objects may include, but are not limited to, Server Message Block (SMB), Network File System (NFS), or AMAZON Simple Storage Service (S3).

Network 111 may include the Internet and/or may include or represent any public or private communications network or other network. For instance, network 111 may be a cellular network, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 111 using any suitable communication techniques. Network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 111 using one or more network links. The links coupling such devices or systems to network 111 may be Ethernet, Asynchronous Transfer Mode (ATM) or other types of network connections, and such connections may be wireless and/or wired connections. One or more of the devices or systems illustrated in FIG. 1 or otherwise on network 111 may be in a remote location relative to one or more other illustrated devices or systems.

Data exchanged over network 111 may be represented using any suitable format, such as hypertext markup language (HTML), extensible markup language (XML), or JavaScript Object Notation (JSON). In some aspects, network 111 may include encryption capabilities to ensure the security of documents. For example, encryption technologies may include secure sockets layers (SSL), transport layer security (TLS), virtual private networks (VPNs), and Internet Protocol security (IPsec), among others.

User devices 108 may interact with document management system 102 through a user account with document management system 102 and optionally one or more user devices accessible to that user. Examples of user devices 108 may include, but are not limited to, portable, mobile, or other devices, such as, for example, mobile phones (e.g., smartphones), laptop computers, desktop computers, tablet computers, smart television systems, server computers, or mainframes. In situations in which document management system 102 stores and uses information of users operating user devices 108, document management system 102 may request explicit permission from the users prior to storing and using any personally identifiable information of the users.

Users of user devices 108 may represent an entity, such as, for example, an individual user, a group, an organization, a governmental entity, or a business entity (e.g., a corporation, limited liability company (LLC), or professional organization) that is able to interact with document packages (or other content) generated on or managed by document management system 102. Each user may be associated with a username, email address, full or partial legal name, or other identifier that may be used by document management system 102 to identify the user and to control the ability of the user to view, modify, execute, or otherwise interact with document packages managed by document management system 102.

Document management system 102 may be configured to allow users of user devices 108 to create and send documents to one or more recipients for negotiation, collaborative editing, electronic execution (e.g., electronic signature), automation of contract fulfillment, archival, and analysis, among other tasks. Document management system 102 may support negotiations between different entities. For example, user device 108A may be associated with a first entity (e.g., a business entity, a particular human being, or a governmental entity) and user device 108N may be associated with a second entity. In this example, user device 108A may send, during a negotiation, a first version of an electronic agreement (e.g., an electronic contract) to document management system 102. Document management system 102 may store the first version of the electronic agreement in historical document database 118 and output the first version of the electronic agreement to user device 108N. In this example, user device 108N may generate a second version of the electronic agreement that includes one or more changes from the first version of the electronic agreement and may send the second version of the electronic agreement to document management system 102. Document management system 102 may store the second version of the electronic agreement in historical document database 118 and output the second version of the electronic agreement to user device 108A. The process may continue until both parties agree (e.g., electronically sign) to the final version of the electronic agreement. In this example, document management system 102 may store the final version of the electronic agreement in historical document database 118. Throughout negotiations, document management system 102 may monitor and/or track the state of the negotiation as well as proactively facilitate negotiations. For example, document management system 102 may automatically provide reminders to user devices 108.

Document management system 102 may provide and/or support a "playbook." For example, the first entity may generate internally and/or with document management system 102 a set of rules for negotiating with other entities. For example, a legal department of the first entity may specify a countries for a jurisdiction clause or a shipping department may specify limitations on delivery timelines. In some examples, document management system 102 may automatically generate a playbook, for example, by inferring rules from previously executed documents. Playbooks may not be shared to other entities (e.g., playbooks are confidential). That is, a second entity would typically not have access to a playbook of a first entity and the first entity would typically not have access to a playbook of the second entity.

Document management system 102 may apply and/or cause user devices 108 to apply rules of a playbook to provide insights during negotiations. For example, document management system 102 may notify user device 108A, which is associated with a first entity, that the playbook for the first entity indicates a primary jurisdiction (e.g., California) and a fallback jurisdiction (e.g., New York) that are different than that proposed in a pending agreement (e.g., Massachusetts). In this example, user device 108A may modify (e.g., with an optional user selection and/or confirmation) a clause of a pending to be compliant with the playbook of the first entity. In this example, document management system 102 may send the revised clause to user device 108N, which is associated with a second entity. In this example, however, the playbook for the second entity indicates a primary jurisdiction (e.g., Massachusetts) and a fallback jurisdiction (e.g., New York) that are different than that proposed in a pending agreement (e.g., California). As such, user device 108N is likely to reject the change to the clause.

In accordance with the techniques of the disclosure, document management system 102 may generate a "counterparty profile." In the example above, document management system 102 may infer a counterparty profile from historical documents stored in historical documents database 118 and accessible by the requesting entity. For instance, document management system 102 may access all versions (e.g., rejected and/or accepted) of agreement documents exchanged during previous negotiations between a first entity and a second entity that are accessible by the first entity. That is, document management system 102 may maintain a confidentiality of documents between entities. For example, when generating a counterparty profile for a first entity, document management system 102 may use the first entities own documents but not any documents provided by the second entity or other entities. Accordingly, the counterparty profile for a particular entity may not necessarily match the particular entity's playbook. In some examples, document management system 102 may use public documents. Inferring the counterparty profile may reduce a time spent negotiating. For example, document management system 102 may recommend, based on the counterparty profile, using a fallback position (e.g., New York) for a jurisdiction clause rather than a preferred jurisdiction of a playbook for the first entity. In this way, document management system 102 may proactively identify positions that are likely to successfully complete a negotiation sooner compared to systems that do not use a counterparty profile and/or rely solely on playbooks.

Document management system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for SoftwareaaS, System-aaS, Infrastructure-aaS, Data Storage-aas (dSaaS), or other type of service.

For example, counterparty profile generator 112 of document management system 102 may generate, for presentation to user device 108A associated with a first entity, a counterparty profile for a second entity. For example, a human user of user device 108A may represent a first entity and a human user of user device 108N may represent a second entity. In response to a change to a pending clause of an electronic agreement being negotiated between the first entity and the second entity, generator 112 may proactively identify relevant historical documents from historical document database 118. For example, document management system 102 may identify a first historical document and a second historical document that have each been used in negotiations between the first entity and the second entity. In this way, generator 112 may reduce a number of historical documents used to generate the counterparty profile compared to systems that use all historical documents, which may reduce an amount of data storage used by generator 112 and/or reduce a processing burden compared to systems that do not identify historical documents negotiated between parties of a pending electronic agreement.

Generator 112 may correlate the pending clause of the electronic agreement with a first clause of a plurality of first clauses of the first historical document and with a second clause of a plurality of second clauses of the second historical document based on first content of the first clause and second content of the second clause. For example, generator 112 may generate, for each clause of each historical document, a vector embedding representing the content of the clause. In some examples, generator 112 may generate the vector embedding for each clause of each historical document prior to receiving the change (e.g., pre-generated). Generator 112 may generate a vector embedding for the pending clause and compare the vector embedding with each respective vector embedding of the first historical document and of the second historical document. Using vector embeddings may allow generator 112 to identify clauses of historical documents that similar but are not exact, for instance, clauses that include different dates or dollar amounts compared to systems that rely solely on word matching. Moreover, prior generation of vector embeddings for clauses of historical documents may allow for vector embeddings to be determined for a historical document less frequently compared to systems that generate a vector embedding for clauses of a historical document for each correlation step, which may reduce an amount of processing power used by generator 112.

Based on the correlation, generator 112 may generate difference information between the first content of the first clause and the second content of the second clause. For example, generator 112 may retrieve the first content and the second content from historical database 118. In this example, generator 112 may generate a prompt to instruct a machine learning model to compare the first content and the second content. In this example, generator 112 may generate the counterparty profile for the second entity based on the difference information.

In instances where the first historical document and the second historical document are executed agreements, the counterparty profile may summarize differences between the pending electronic agreement and the previously executed documents. For instance, generator 112 may prompt a machine learning model to summarize the difference information. In this instance, generator 112 may proactively provide, to user device 108A, a counterparty profile that includes a summary of clauses of a same type of the changed pending clause that have been successful in negotiations with the second entity. Providing the summary of clauses may reduce an amount of data sent to user device 108A compared to systems that always send the entire listing of clauses, which may reduce an amount of data and/or bandwidth used to send the counterparty profile compared to systems that always send the entire content of clauses.

The historical documents may include rejected clauses and accepted clauses. For example, generator 112 may determine that a first clause of the first historical document has been accepted by the second entity in response to determining that the second entity has executed the first historical document. In this example, generator 112 may determine that a second clause of the second historical document has been rejected by the second entity in response to determining that the second entity has proposed a change to the second clause. For example, the second historical document may have been a change proposed by the first entity and rejected by the second entity during a previous negotiation between the first entity and the second entity. In this example, the first historical document may have been the final successful result of the previous negotiations that included the second historical document. In some examples, the first historical document may be part of a different negotiation than the second historical document.

In examples where historical documents include rejected clauses and accepted clauses, generator 112 may generate a counterparty profile to provide insights for a pending claim. For example, generator 112 may include a count of successful historical clauses for various values. For instance, generator 112 may include a pie chart showing a breakdown of jurisdictions accepted by a counterparty (e.g., the second entity) and/or an acceptance rate for each jurisdiction (See FIG. 4). In some examples, generator 112 may identify a primary position and one or more fallback positions for the counterparty and/or a time to sign for the primary position and one or more fallback positions (See FIG. 5). As used herein, a primary position (also referred to herein as a "standard position") may refer to a value (e.g., CA, MA, NY) for a clause (e.g., jurisdiction) by a counterparty that is the most frequently selected by the counterparty compared to other values selected by the counterparty. A fallback position may refer to a value for a clause by a counterparty that is the not the most frequently selected value by the counterparty, which may represent a non-preferred value but acceptable for the counterparty.

Counterparty profile generator 212 may generate data for a user interface for presentation of the counterparty profile. For example, counterparty profile generator 212 may generate data for a user interface for presentation of one or more of summary information of previous clauses for counterparty, a standard position (and optionally one or more fallback positions) of the counterparty for a pending clause, a count of each attribute value for an attribute of the pending clause, an acceptance rate or likelihood of success of each attribute value for an attribute of the pending clause, a suggested value for an attribute (e.g., a number of years in a warranty clause or a jurisdiction in a jurisdiction clause) of the counterparty for a pending clause, or an expected execution time for one or more values for the attribute. Counterparty profile generator 212 may cause a computing device to display the user interface. For example, counterparty profile generator 212 may output, to user device 108A associated with the first entity, an indication of the counterparty profile for the second entity associated with user device 108B.

In response to a selection from user device 108A (e.g., automatically or based on a user input) of a value for the attribute in the pending clause, document management system 202 may generate an updated version of the electronic agreement being negotiated between a first entity and a second entity. In this example, document management system 202 may store the updated version of the electronic agreement at historical documents database 218 and cause a computing device to display an indication of the updated version of the electronic agreement. For example, document management system 202 may generate data for a user interface for presentation of the updated version of the electronic agreement. In some examples, document management system 202 may generate a counterparty profile for the second entity using data accessible to the second entity. For instance, counterparty profile generator 212 may generate the counterparty profile of first entity that indicates one or more of summary information of previous clauses for the first entity, a standard position (and optionally one or more fallback positions) of the first entity for the pending clause, a count of each attribute value for an attribute of the pending clause for the first entity, an acceptance rate or likelihood of success of each attribute value for an attribute of the pending clause for the first entity, a suggested value for an attribute for a pending clause, or an expected execution time for one or more values for the attribute. Counterparty profile generator 212 may cause a computing device to display the user interface. For example, counterparty profile generator 212 may output, to a computing device associated with the second entity, an indication of the updated version of the electronic agreement and optionally a counterparty profile for the first entity. For instance, counterparty profile generator 212 may output, to user device 108B associated with the second entity, an indication of the updated version of the electronic agreement and optionally an indication of a counterparty profile for the first entity associated with user device 108A.

The techniques described herein may provide one or more technical advantages that realize one or more practical applications. For example, document management system 102 may proactively provide richer information to support a generation of the executed electronic agreement that finalizes the negotiation between the entity and a counterparty than systems that do not generate a counterparty profile (e.g., systems that rely only on a playbook), which may reduce a number of versions of an electronic agreement managed by document management system 102 and/or reduce a time to negotiate the electronic agreement. Reducing a number of versions of an electronic agreement managed by document management system 102 and/or reducing a time to negotiate the electronic agreement may reduce an amount of computational burden on document management system 102, reduce an amount of power consumed by document management system 102, reduce an amount of data transmitted and received by document management system 102 and/or reduce a memory usage of document management system 102. Moreover, techniques described herein to determine historical documents based on an indication of a change may further improve document management system 102 itself, by for example, reducing a number of historical documents reviewed compared to systems that correlate a pending clause with all historical documents. In some examples, techniques described herein to correlate the pending clauses with clauses of historical documents using vector embeddings mapped to content of the clauses of the historical documents may further improve document management system 102 itself, by for example, reducing a computational burden to correlate compared to systems that correlate directly from the content of the clauses of the historical document or that re-compute vector embeddings each time a pending clause is correlated with clauses of historical documents. Moreover, techniques described herein to generate the counterparty profile may further improve document management system 102 itself, by for example, compressing and/or reduce an amount of information provided to user devices 108 compared to systems that output all content of clauses of the historical document that are correlated with the pending clause.

Figure 2:
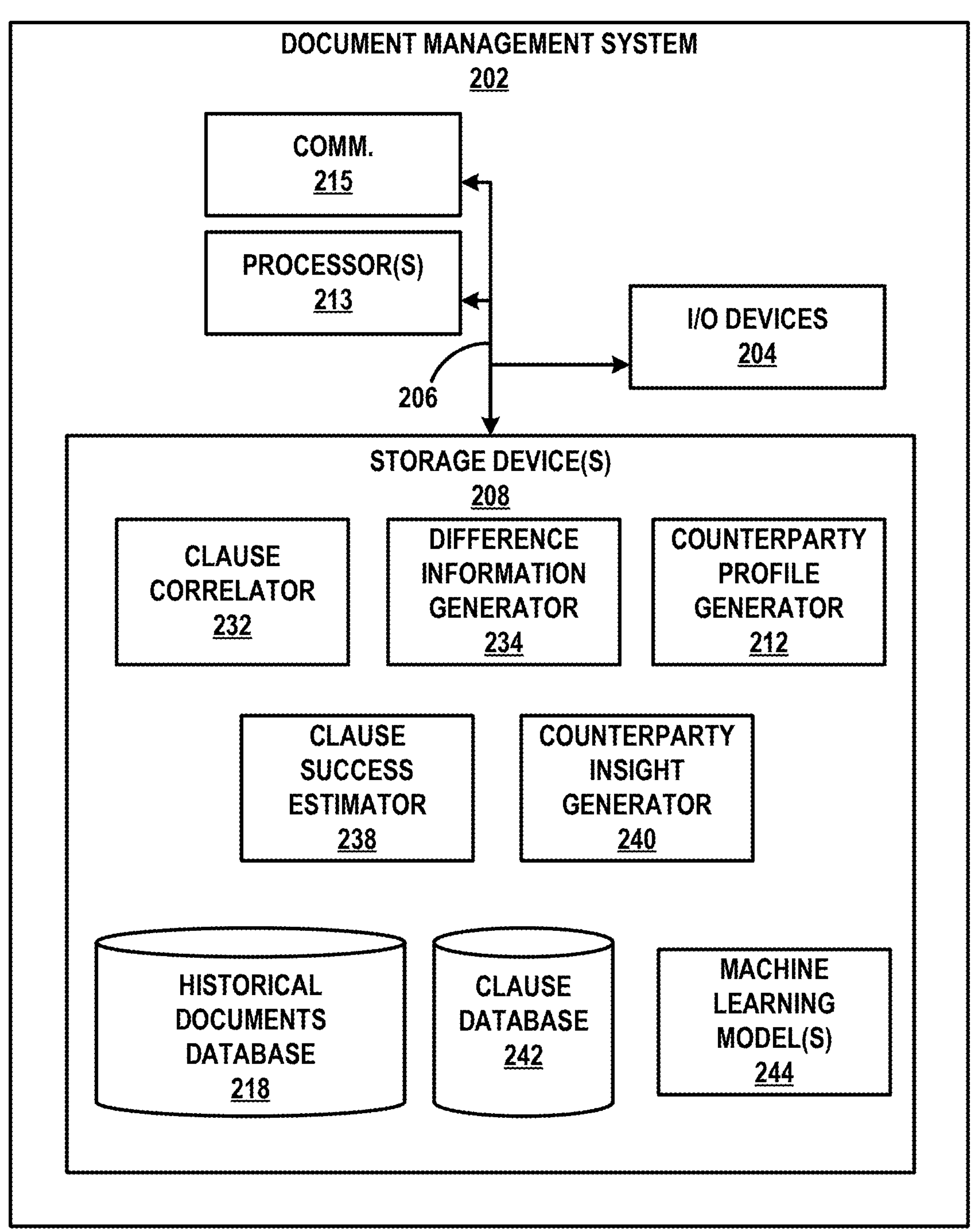
FIG. 2 is a block diagram illustrating an example document management system for generating a counterparty profile for an electronic agreement, in accordance with techniques of this disclosure.

FIG. 2 is a block diagram illustrating an example document management system 202 for generating a counterparty profile for an electronic agreement, in accordance with techniques of this disclosure. Document management system 202 includes communication units 215, one or more processors 213, input/output (I/O) devices 204, one or more storage devices 208, and communication channels 206. FIG. 2 illustrates only one particular example of document management system 202, and many other examples of document management systems may be used in other instances and may include a subset of components included in example document management system 202 or may include additional components not shown in FIG. 2. For example, functionality of processors 213, communication units 215, I/O devices 204, and/or storage devices 208 may be distributed across multiple computing devices within a cloud-based environment provided by document management system 202.

Communication channels 206 may interconnect each of the components 215, 213, 204, and 208 for inter-component communications (e.g., physically, communicatively, and/or operatively). In some examples, communication channel 206 may include a system bus, a network connection, an inter-process communication data structure, or any other method for communicating data. Communication units 215 of document management system 202 may communicate with one or more external devices via one or more wired and/or wireless networks by transmitting and/or receiving network signals on the one or more networks. Examples of communication units 215 include a network interface card (e.g., such as an Ethernet card), an optical transceiver, a radio frequency transceiver, a GNSS receiver, or any other type of device that can send and/or receive information. Other examples of communication units 215 may include short wave radios, cellular data radios (for terrestrial and/or satellite cellular networks), wireless network radios, as well as universal serial bus (USB) controllers.

One or more input devices of I/O devices 204 may represent any input devices of document management system 202 not otherwise separately described herein. Input devices of I/O devices 204 may generate, receive, and/or process input. For example, one or more input devices of I/O devices 204 may generate or receive input from a network, a user input device, or any other type of device for detecting input from a human or machine.

One or more output devices of I/O devices 204 may represent any output devices of document management system 202 not otherwise separately described herein. Output devices of I/O devices 204 may generate, present, and/or process output. For example, one or more output devices of I/O devices 204 may generate, present, and/or process output in any form. Output devices of I/O devices 204 may include one or more universal serial bus (USB) interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

Processors 213 may include processing circuitry for implementing functionality and/or execute instructions within document management system 202. For example, processors 213 may receive and execute instructions to generate a counterparty profile. These instructions executed by processors 213 may cause document management system 202 to store and/or modify information within storage devices 208 or processors 213 during program execution. Processors 213 may execute instructions of clause correlator 232, difference information generator 234, counterparty profile generator 212, clause success estimator 238, counterparty insight generator 240. In some instances, processors 213 may include processing circuitry associated with cloud computing processing components (e.g., distributed processors across a cloud computing system).

Storage devices 208 may further include historical documents database 216 and clause database 242. Historical documents database 216 may store historical documents, such as, for example, executed agreements (e.g., electronic contracts) and/or unexecuted documents (e.g., rejected agreement documents). Clause database 242 may store vectors (e.g., vector embeddings) for each clause of historical documents stored in historical documents database 216. For example, clause correlator 232 may generate a vector embedding for each clause of a historical document and store the vector embedding in clause database 242. In some examples, clause correlator 232 may store a mapping of a vector embedding for a particular clause to a content of the particular clause. For instance, clause correlator 232 may store a mapping in clause database 242 for a clause mapping that indicates (e.g., a pointer) a clause of a historical document stored by historical documents database 216. Storage devices 208 may include one or more computer-readable storage media. In some instances, storage devices 108 may include cloud storage components (e.g., distributed storage devices across a cloud computing environment).

One or more machine learning models 244, (also referred to herein as simply "machine learning model 244") may include one or more generative machine learning models and/or one or more traditional machine learning models. Examples of generative machine learning models may include, for example, transformer-based deep neural networks or large language models (LLMs). Generative machine learning models may be associated with natural language prompts, or simply "prompts." Examples of traditional machine learning models may include, for example, a rule-based machine learning model or a deterministic machine learning model. Traditional machine learning models may be associated with training data.

Machine learning model 244 may include a generative machine learning model configured to correlate a pending clause of an electronic agreement with a clause of a historical document. The generative machine learning model (e.g., a Bidirectional Encoder Representations from Transformers or "BERT" machine learning model) configured to correlate the pending clause may be the same or different from a machine learning model used to generate vector embeddings. For example, machine learning model 244 (e.g., a universal sentence encoder) may generate vector embeddings (e.g., document embeddings) that describe a set of documents. The set of documents may include part or all of the documents stored by historical documents database 218, a working document (e.g., an electronic agreement being negotiated), and/or other documents (e.g., public documents). As described in further details herein, machine learning model 244 may include one or more generative machine learning models (e.g., a BERT machine learning model) and/or one or more traditional machine learning models configured to generate difference information that describe differences between clauses. The one or more machine learning models used to generate the difference information may be the same or different from the machine learning models configured to correlate a pending clause. Machine learning model 244 may include one or more generative machine learning models and/or one or more traditional machine learning models configured to generate a counterparty profile that describe characteristics of a counterparty. The one or more machine learning models used to generate the counterparty profile may be the same or different from the one or more machine learning models configured to correlate a pending clause and/or the one or more machine learning models used to generate the difference information. Similarly, machine learning model 244 may include a generative or traditional machine learning model (e.g., a visualization tool, such as, for instance, Tensorboard™ or Matplotlib™) configured to generate a visual representation of graphical data (e.g., a pie chart, a bar chart, or a plot), which may be different from other machine learning models of one or more machine learning models 244.

In accordance with the techniques of the disclosure, clause correlator 232 may determine entities negotiating an electronic agreement. For example, clause correlator 232 may determine that an electronic agreement is between a first entity and a second entity (e.g., the counterparty) based on a template and/or content of the electronic agreement. For instance, the first entity may generate an initial version of the electronic agreement using a template that is associated with the second entity. In this instance, clause correlator 232 may determine that an electronic agreement is between the first entity and the second entity based on determining that the first entity generated the initial version of the electronic agreement and that an object of the template associated with a counterparty indicates the second entity. In some examples, clause correlator 232 may determine that an electronic agreement is between a first entity and a second entity directly from the electronic agreement. For instance, clause correlator 232 may determine text of the electronic agreement (e.g., perform an optical character recognition (OCR) operation), determine the first entity and the second entity from objects of the electronic agreement. While the above examples referred to one counterparty, other examples may include more than one counterparty (e.g., a second entity and a third entity).

Clause correlator 232 may determine a change to a pending clause of an electronic agreement being negotiated between the first entity and the second entity. Changes to a pending clause may occur, for example, in an existing electronic agreement that has been sent to a counterparty but not yet executed and/or when adding a new clause to the electronic agreement. For example, clause correlator 232 may compare content of a pending clause in an updated version of the electronic agreement with content of the pending clause with a previous version of the electronic agreement. In this example, clause correlator 232 may determine a change to the pending clause has occurred when the comparison indicates that the content of the pending clause has changed. For instance, clause correlator 232 may determine that content of an indemnification clauses has changed from a previous version of the electronic agreement.

Clause correlator 232 may receive from a user device 108 of FIG. 1 an indication that a pending clause has changed. For example, document management system 102 may configure user devices 108 to output an indication of pending clauses. In this example, in response to a selection of a change in value (e.g., automatically by user device 108A or using a user input), user device 108B may output, to clause correlator 232, an indication of the change to pending clause. Clause correlator 232 may receive, from user device 108B and associated with the second entity, the indication of the change to the pending clause of the electronic agreement. In some examples, clause correlator 232 may receive, from user device 108A and associated with the first entity, the indication of the change to the pending clause of the electronic agreement. Clause correlator 232 may determine that the change to the pending clause of an electronic agreement has occurred based on the change from one or more of user devices 108.

Clause correlator 232 may determine historical documents from historical documents database 218 based on the second entity and optionally based further on the first entity. For example, clause correlator 232 may identify a first historical document and a second historical document that have each been used in negotiations between the first entity and the second entity. For instance, historical documents database 218 may include a mapping of each document to metadata specifying entities associated with each document. In this instance, clause correlator 232 may identify the first historical document based on the metadata for the first historical document specifying the first entity and the second entity and clause correlator 232 may identify the second historical document based on the metadata for the second historical document specifying the first entity and the second entity. For example, clause correlator 232 may determine, based on the metadata, that the first entity corresponds to a party of the first historical document and the second entity corresponds to a counterparty of the first historical document. Similarly, clause correlator 232 may determine, based on the metadata, that the first entity corresponds to the party of the second historical document and the second entity corresponds to the counterparty of the second historical document. In this way, document management system 202 may reduce a number of historical documents used to generate the counterparty profile, which may reduce an amount of data storage used by document management system 202 and/or reduce a processing burden compared to systems that do not identify historical documents negotiated between parties of a pending electronic agreement. Determining historical documents in response to changes to a pending clause may help to reduce an occurrence of repeating steps (e.g., correlation of a pending clause with clauses from historical documents) by including more recent documents that are relevant than systems that periodically identify historical documents, which may help to reduce a processing burden of document management system 202. While the previous example identified two historical documents, in other examples, document management system 202 may identify one or more than two historical documents (e.g., tens or hundreds of historical documents).

Clause correlator 232, with machine learning model 244, may correlate a pending clause of the electronic agreement with clauses of the historical documents. For example, clause correlator 232, with machine learning model 244, may generate vector embeddings for clauses of the historical documents. For example, clause correlator 232, with machine learning model 244, or more particularly, for example, an unsupervised machine learning model (e.g., a traditional machine learning model configured for clustering), may generate vector embeddings (e.g., document embeddings) that describe a set of documents. The set of documents may include part or all of the documents stored by historical documents database 218, a working document (e.g., an electronic agreement being negotiated), and/or other documents (e.g., public documents). For example, clause correlator 232, with machine learning model 244, may generate vector embeddings for all clauses of all of the historical documents. In some examples, clause correlator 232, with machine learning model 244, may generate a vector embedding model. As used herein, a vector embedding may include field values (e.g., numerical vectors) that describe content of a document. A vector embedding model may describe a transformation of unstructured data into the vector embedding. Clause correlator 232 may store, at clause database 242, the vector embeddings for historical documents before receiving an indication of a change of a pending clause of an electronic agreement and/or before generation of the electronic agreement. Clause correlator 232 may store the vector embedding model in clause database 242. While the above example used an unsupervised machine learning model, other examples may include other types of machine learning models, for example, generative machine learning models.

Clause correlator 232, with machine learning model 244, may generate vector embeddings for one or more pending cluses of an electronic agreement being negotiated. In this example, clause correlator 232, with machine learning model 244, may determine a vector embedding for pending clause of the electronic agreement based on pending content of a pending clause. For instance, clause correlator 232, with machine learning model 244, may generate a vector embedding using the pending content of the pending clause as an input with an instruction to generate the vector embedding for the pending clause using the vector embedding model associated with the historical documents.

Clause correlator 232 may select a clause of a historical document based on the vector embeddings. For example, clause correlator 232 may determine the pending clause correlates with the first clause of a first historical document based on the vector for the pending clause. For example, clause correlator 232 may determine a similarity metric based on a comparison of the vector embeddings of the pending clause and the vector embeddings of the first clause of the first historical document. For instance, clause correlated 232 may determine a cosine similarity or Euclidean distance. In this example, clause correlator 232 may determine that the pending clause correlates with the first clause of a first historical document based on a determination that the similarity metric satisfies a threshold value. Similarly, clause correlator 232 may determine the pending clause correlates with the second clause of a second historical document based on the vector for the pending clause. For example, clause correlator 232 may determine a similarity metric based on a comparison of the vector embeddings of the pending clause and the vector embeddings of the second clause of the second historical document.

Clause correlator 232 may perform a cosine similarity with a threshold check. For example, clause correlator 232 may determine first vector embeddings for a pending clause (e.g., a termination clause for material breach). In this example, clause correlator 232 may determine second vector embeddings for a first historical clause of a first historical document (e.g., a termination clause for material breach similar to the pending clause). Clause correlator 232 may determine third vector embeddings for a second historical clause of a second historical document (e.g., a termination clause for material breach that is different from the pending clause).

Clause correlator 232 may determine a cosine similarity based on the first vector embeddings, the second vector embeddings, and the third vector embeddings. For example, clause correlator 232 may determine a first cosine similarity value between the first vector embeddings and the second vector embeddings. In this example, clause correlator 232 may determine whether the first cosine similarity value satisfies a threshold value. For instance, based on a determination that the cosine similarity value (e.g., 0.9) between the first vector embeddings and the second vector embeddings is greater than a threshold value (e.g., 0.8), clause correlator 232 may determine that the first cosine similarity value satisfies the threshold value. Based on a determination that the first cosine similarity value satisfies the threshold value, clause correlator 232 may determine that the pending clause correlates to the first historical clause of the first historical document. Similarly, clause correlator 232 may determine a second cosine similarity value between the first vector embeddings and the third vector embeddings. In this example, clause correlator 232 may determine whether the second cosine similarity value satisfies a threshold value. For instance, based on a determination that the cosine similarity value (e.g., 0.5) between the first vector embeddings and the third vector embeddings is less than a threshold value (e.g., 0.8), clause correlator 232 may determine that the second cosine similarity value does not satisfy the threshold value. Based on a determination that the second cosine similarity value does not satisfy the threshold value, clause correlator 232 may determine that the pending clause does not correlate to the second historical clause of the second historical document.

Clause correlator 232 may determine the threshold value for cosine similarity based on the pending clause. For example, clause correlator 232 may determine that the threshold value is 0.8 based on content of a first pending clause and may determine that the threshold value is 0.7 based on content of a second pending clause (e.g., the second pending clause as broader content than the first pending clause). Based on a determination that a cosine similarity value (e.g., 0.9) between a first vector embeddings and a second vector embeddings is greater than the threshold value (e.g., 0.7), clause correlator 232 may determine that the first cosine similarity value satisfies the threshold value. Similarly, based on a determination that the cosine similarity value (e.g., 0.72) between the first vector embeddings and the third vector embeddings is greater than the threshold value (e.g., 0.7), clause correlator 232 may determine that the second cosine similarity value satisfies the threshold value. Based on a determination that the first cosine similarity value and the second cosine similarity value satisfy the threshold value, clause correlator 232 may determine that the pending clause correlates to both the second historical clause of the second historical document and the third historical clause of the third historical document.

Based on the correlation, difference information generator 234 may generate difference information between the first content of the first clause and the second content of the second clause. Difference information generator 234 may determine whether the first clause of the first historical document and the second clause of the second historical document have been approved by the second entity (e.g., the counterparty). For example, in response to determining that the first historical document has been executed by the second entity and that the second historical document has been executed by the second entity, difference information generator 234 may determine that both the first clause and the second clause have been approved by the second entity. Based on a determination that the both the first clause and the second clause have been approved, difference information generator 234 may generate summary information based on the first content of the first clause and the second content of the second clause. For example, difference information generator 234 may cause machine learning model 244 (e.g., a generative machine learning model) to generate the summary information using the first content of the first clause and the second content of the second clause as an input. In this example, counterparty profile generator 212 may generate a counterparty profile for the second entity based on the difference information. For instance, counterparty profile generator 212 may generate the counterparty profile to indicate the summary information.

Clause success Estimator 238 may determine successful count values for an attribute (e.g., a number of executed agreements with jurisdiction clauses selected in each of California, Massachusetts, and NY). For example, clause success estimator 238 may, based on a determination that the first historical document has been executed by the second entity and that the first content indicates a first value for an attribute for the pending clause, determine a first success count value for the first value. For instance, clause success Estimator 238 may increment a count of a number of contracts that identified California in the jurisdiction clause when the jurisdiction clause indicates a value of California and when the first historical document has been executed by the second entity (e.g., approved by the second entity). Similarly, based on a determination that the second historical document has been executed by the second entity and that the second content indicates a second value for the attribute for the pending clause, clause success estimator 238 may determine a second success count value for the second value. For instance, clause success Estimator 238 may increment a count of a number of contracts that identified Massachusetts in the jurisdiction clause when the jurisdiction clause indicates a value of Massachusetts and when the first historical document has been executed by the second entity (e.g., approved by the second entity).

Counterparty profile generator 212 may indicate a standard value for the second entity. For example, clause success estimator 238 may determine that the first success count value is greater than the second success count value. For instance, clause success estimator 238 may determine that a count value for California as selected in the jurisdiction clause is greater than a count value for Massachusetts as selected in the jurisdiction clause. Based on a determination that the first success count value is greater than the second success count value, counterparty profile generator 212 may generate the counterparty profile to indicate that the first value is a standard value for the attribute. For instance, counterparty profile generator 212 may generate the counterparty profile to indicate that California is the standard value for the second entity. Similarly, counterparty profile generator 212 may indicate one or more fallback values for the second entity. Based on a determination that the first success count value is greater than the second success count value, counterparty profile generator 212 may generate the counterparty profile to indicate that the second value is a fallback value for the attribute. For instance, counterparty profile generator 212 may generate the counterparty profile to indicate that Massachusetts is a fallback value for the second entity.

Counterparty insight generator 240 may suggest a value for the attribute in the pending clause. For example, counterparty insight generator 240 may generate a prompt or notification that causes a user interface to indicate the suggested value for the attribute to a user device 108A associated with the first entity. For example, counterparty insight generator 240 may generate the counterparty profile to suggest the first value for the attribute in the pending clause based on a determination that the first success count value is greater than the second success count value. For instance, counterparty profile generator 212 may generate the counterparty profile to suggest California as the selected jurisdiction in the jurisdiction clause.

Counterparty insight generator 240 may determine expected execution time for values of an attribute in a pending clause. For example, counterparty insight generator 240 may generate a first expected execution time for the first value for the attribute based on a first execution time for the first historical document. For instance, counterparty insight generator 240 may determine the first expected execution time as an average of a time to execution (e.g., from sending the initial contract to the second entity to execution) for the first historical document and each historical document of one or more first historical documents that include the first value for the attribute and have been executed by the second entity. For instance, counterparty insight generator 240 may determine the first expected execution time for California as a value set as the jurisdiction attribute of a jurisdiction clause as an average of a time to execution the first historical document and each historical document of one or more first historical documents that include California as the value set for the jurisdiction attribute and have been executed by the second entity.

Similarly, counterparty insight generator 240 may generate a second expected execution time for the second value for the attribute based on a second execution time for the second historical document. For instance, counterparty insight generator 240 may determine the second expected execution time as an average of a time to execution for the second historical document and each historical document of one or more second historical documents that include the second value for the attribute and have been executed by the second entity. For instance, counterparty insight generator 240 may determine the second expected execution time for Massachusetts as a value set as the jurisdiction attribute of a jurisdiction clause as an average of a time to execution the second historical document and each historical document of one or more second historical documents that include Massachusetts as the value set for the jurisdiction attribute and have been executed by the second entity. Counterparty insight generator 240 may generate the counterparty profile to indicate the first expected execution time for the first value for the attribute and the second expected execution time for the second value for the attribute. For instance, counterparty insight generator 240 may generate the counterparty profile to indicate the average execution time (e.g., hours, days, weeks) for California as a value set as the jurisdiction attribute of a jurisdiction clause and the average execution time for Massachusetts as a value set as the jurisdiction attribute of the jurisdiction clause.

Clause success estimator 238 may determine success count values for an attribute and/or failure count values for the attribute. For example, clause success estimator 238 may, based on a determination that the first historical document has been executed by the second entity and that the first content indicates a particular value for an attribute for the pending clause, determine a success count value for the particular value. For instance, clause success estimator 238 may increment a success count value for California as the value set as the jurisdiction attribute of a jurisdiction clause in response to determining that the first historical document has been executed by the second entity and that the jurisdiction clause of the first historical document indicates California as the value set as the jurisdiction attribute of a jurisdiction clause. Similarly, clause success estimator 238 may, based on a determination that the second historical document has been rejected by the second entity and that the second content indicates the particular value for the attribute for the pending clause, determine a failure count value for the particular value. For instance, clause success estimator 238 may increment a failure count value for New York as the value set as the jurisdiction attribute of a jurisdiction clause in response to determining that the second historical document has been rejected by the second entity and that the jurisdiction clause of the first historical document indicates New York as the value set as the jurisdiction attribute of a jurisdiction clause. Clause success estimator 238 may determine that a document has been rejected when, for example, the second entity proposed changing the particular value for the attribute for the pending clause. For instance, clause success estimator 238 may determine that a document has been rejected when, for example, the second entity proposed changing the jurisdiction from New York to California.

Counterparty profile generator 212 may generate the counterparty profile to indicate a likelihood of success for the particular value for an attribute in a pending clause based on the success count value and the failure count value. For example, counterparty profile generator 212 may output the result of dividing the success count value by the summation of both the success count value and the failure count value. Counterparty profile generator 212 may generate the counterparty profile to suggest the particular value for the particular value for an attribute in a pending clause based on the success count value and the failure count value. For example, counterparty profile generator 212 may generate the counterparty profile to suggest a particular value for the attribute in the pending clause based on a determination that the likelihood of success for the particular value is greater than the likelihood of success for other values for the attribute. For instance, counterparty profile generator 212 may generate the counterparty profile to suggest California as the selected jurisdiction in the jurisdiction clause when the likelihood of success for California is greater than the likelihood of success for Massachusetts and NY.

Counterparty profile generator 212 may generate data for a user interface. For example, counterparty profile generator 212 may generate a prompt to machine learning model to generate a visual representation of a set of data. Examples of visuals representations of a set of data may include, for example, a pie chart, a bar chart, or a plot. For example, counterparty profile generator 212 may generate data for a user interface illustrated in FIG. 4 and/or FIG. 5. Counterparty profile generator 212 may cause one or more of user devices 108 to display the user interface. For instance, counterparty profile generator 212 may cause user device 108A to display, to a user associated with the first entity, a user interface with visual representations of a counterparty profile providing insights for a second entity associated with user device 108B.

Figure 3:
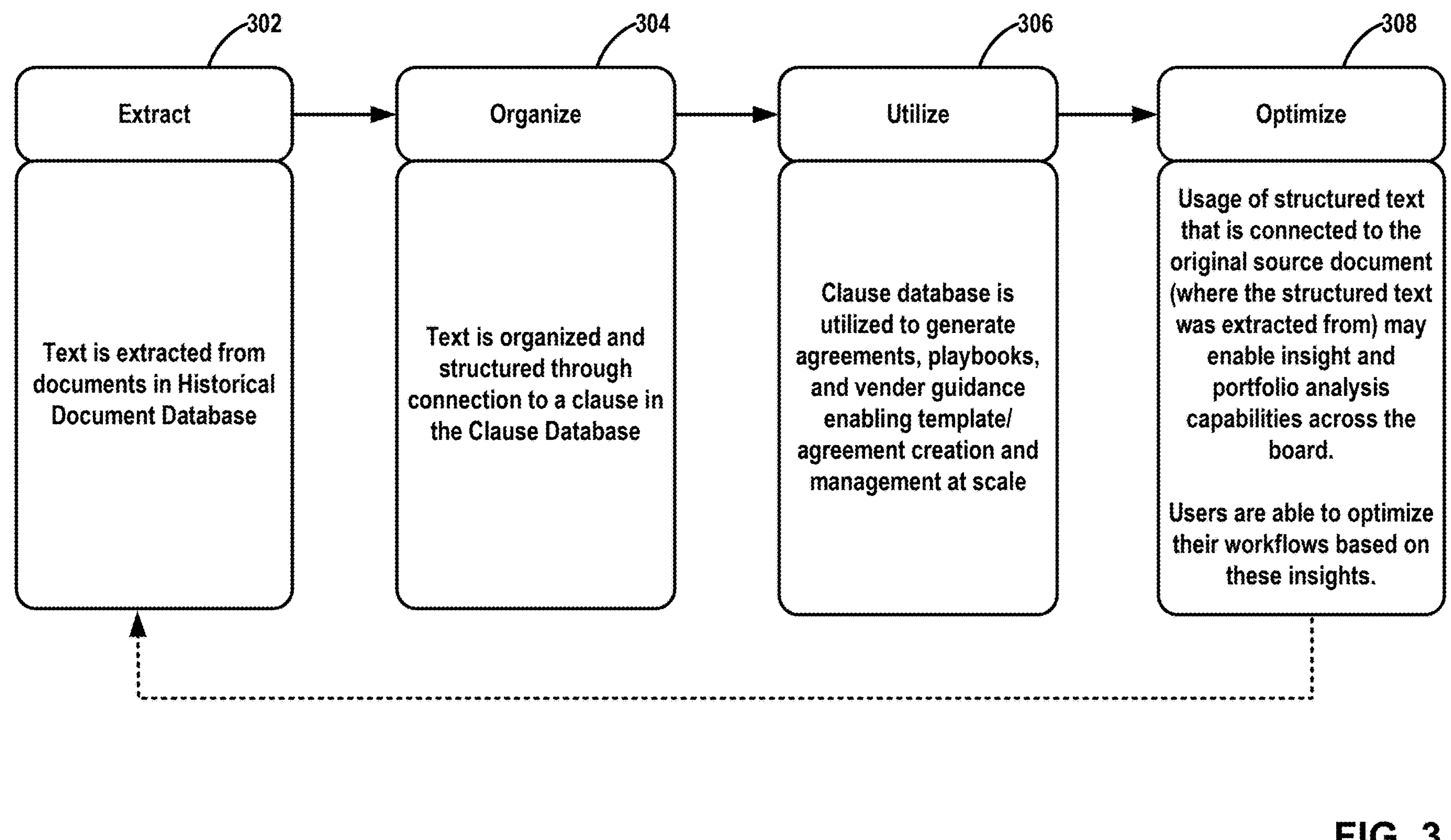
FIG. 3 is a conceptual flow chart illustrating an example process for extracting information from historical documents to generate a counterparty profile, in accordance with one or more techniques of this disclosure.

FIG. 3 is a conceptual flow chart illustrating example process for extracting information from historical documents to generate a counterparty profile, in accordance with one or more techniques of this disclosure. FIG. 3 is discussed with reference to FIGS. 1-2 for example purposes only.

Clause correlator 232 may extract text from documents in historical database 218 (302). Clause correlator 232 may organize and/or structure the text through connection to a clause in clause database 242 (304). For example, clause correlator 232 may generate a vector embedding for each clause of a historical document and store the vector embedding in clause database 242. Clause correlator 232 may store a mapping of a vector embedding for a particular clause to a content of the particular clause. For instance, clause correlator 232 may store a mapping in clause database 242 for a clause mapping that indicates (e.g., a pointer) a clause of a historical document stored by historical documents database 216.

Clause correlator 232 may utilize clause database 242 to generate one or more of an agreement, a playbook, or vender guidance, which may enable template and/or agreement creation and/or document management at scale (306). For example, difference information generator 234 may generate difference information between content of clauses in historical documents. In this example, difference information generator 234 may generate a summary of the differences and counterparty profile generator 212 may generate a counterparty profile to indicate the summary information. For instance, the counterparty profile may indicate that a counterparty has allowed for both a company's standard indemnity clause language and for the company's fallback indemnity clause language, which may be used by user device 108A, or a human user of user device 108A, to determine whether to use the company's standard indemnity clause language or the company's fallback indemnity clause language.

Clause success estimator 238 and/or counterparty insight generator 240 may optimize a usage of structured text that is connected to the original source document (e.g., where the structured text was extracted from), which may enable insight and/or portfolio analysis capabilities to help allow users to optimize workflows based on insights (308). For example, clause success estimator 238 and/or counterparty insight generator 240 may generate one or more of a success count value, a counterparty's standard value and/or fallback values, an expected execution time, or a likelihood of success. For instance, clause success estimator 238 may determine an acceptance rate by a counterparty of California as the selected jurisdiction in the jurisdiction clause, that California is a standard position for the counterparty and that Massachusetts is a fallback position, that the contract has a 70% chance of being executed (e.g., electronically signed) with California as the selected jurisdiction, and that the expected execution time is less than when selecting New York as the selected jurisdiction.

Figure 4:
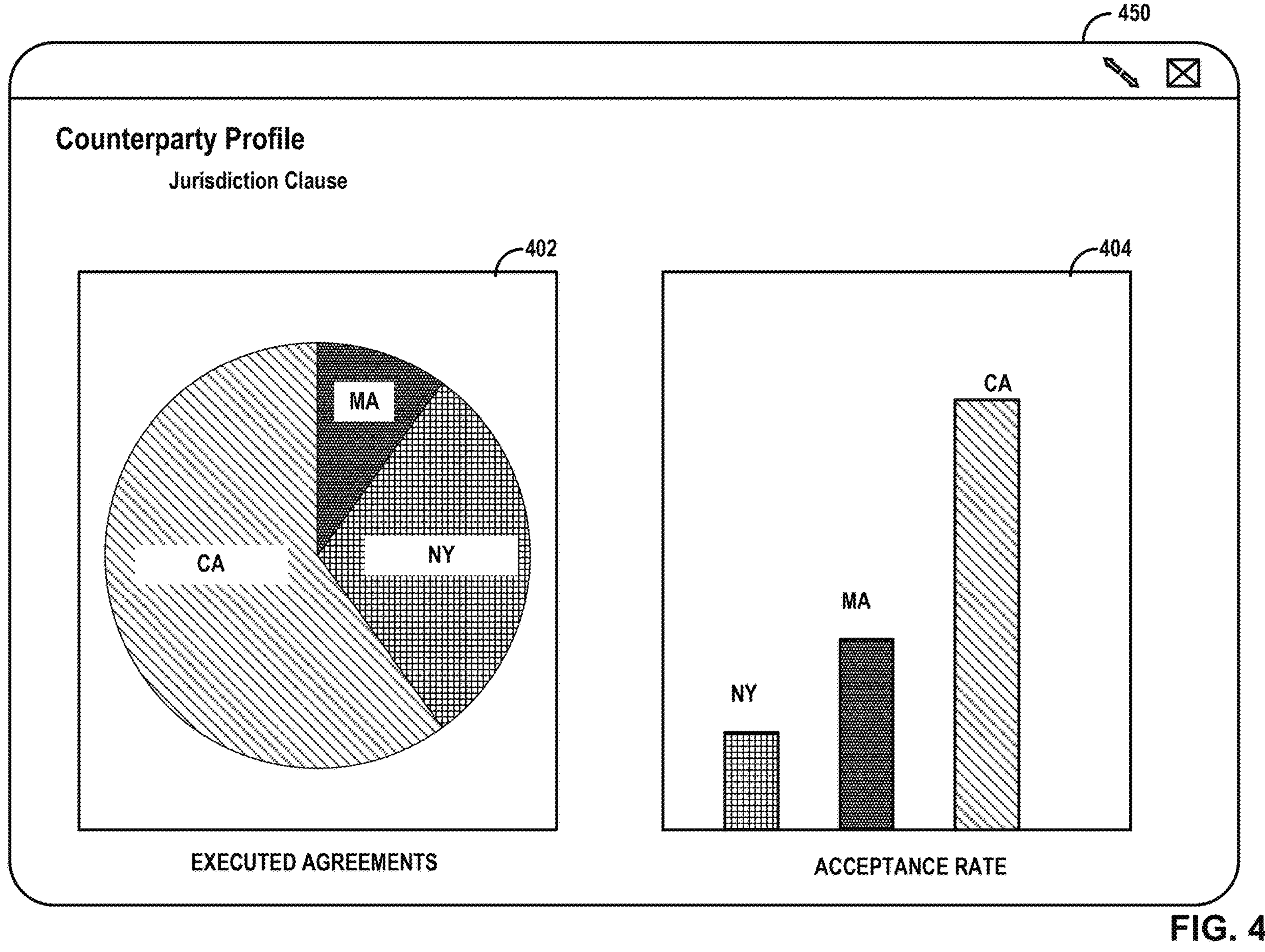
FIG. 4 is a conceptual diagram illustrating an example graphical user interface presenting a counterparty profile, in accordance with techniques of this disclosure.

FIG. 4 is a conceptual diagram illustrating an example graphical user interface presenting a counterparty profile, in accordance with techniques of this disclosure. FIG. 4 is discussed with reference to FIGS. 1-3 for example purposes only.

Counterparty profile generator 212 may generate data for graphical user interface 450. Counterparty profile generator 212 may generate graphical user interface 450 to include executed agreement count information 402 and acceptance rate information 404. For example, clause success estimator 238 may generate a first success count value for a first value for an attribute for the pending clause and a second success count value for a second value for the attribute for the pending clause. For instance, clause success estimator 238 may generate a first success count value for value of California ("CA") for a jurisdiction attribute and a second success count value of New York ("NY") for the jurisdiction attribute. In this example, counterparty profile generator 212 may generate a user interface that includes executed agreement count information 402. Counterparty profile generator 212 may cause user device 108A to display the user interface that includes executed agreement count information 402. In the example of FIG. 4, the success count values are shown as a pie chart, but in other examples, the success count values may be shown in different charts (e.g., a plot or bar chart) and/or shown using text.

Counterparty profile generator 212 may generate the counterparty profile to indicate a likelihood of success (illustrated as "acceptance rate") for a particular value for an attribute in a pending clause based on the success count value and the failure count value. For example, counterparty profile generator 212 may output the result of dividing the success count value by the summation of both the success count value and the failure count value. For instance, counterparty profile generator 212 may generate a first likelihood of success for California ("CA") for a jurisdiction attribute and a second likelihood of success for New York ("NY") for the jurisdiction attribute. In this example, counterparty profile generator 212 may generate a user interface that includes acceptance rate information 404. Counterparty profile generator 212 may cause user device 108A to display the user interface that includes acceptance rate information 404. In the example of FIG. 4, the likelihood of success values are shown as a bar chart, but in other examples, the success count values may be shown in different charts (e.g., a plot or pie chart) and/or shown using text.

Figure 5:
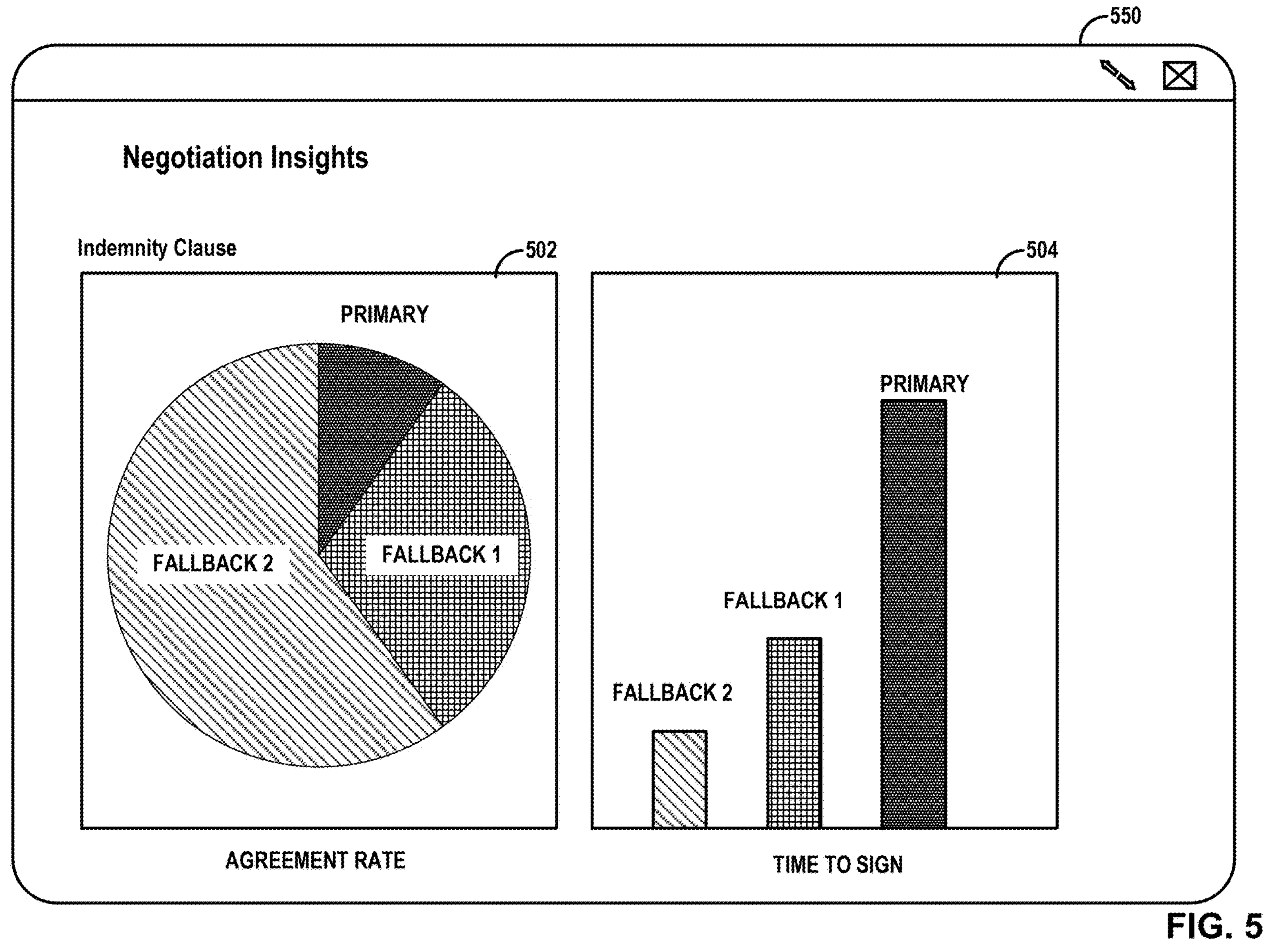
FIG. 5 is a conceptual diagram illustrating an example graphical user interface presenting negotiation insights, in accordance with techniques of this disclosure.

FIG. 5 is a conceptual diagram illustrating an example graphical user interface presenting negotiation insights, in accordance with techniques of this disclosure. FIG. 5 is discussed with reference to FIGS. 1-4 for example purposes only.

Counterparty profile generator 212 may generate data for graphical user interface 550. Counterparty profile generator 212 may generate graphical user interface 550 to include agreement rate information 502 and time to sign information 504. For example, clause success estimator 238 may generate a first success count value for a first value for an attribute for an indemnity clause and a second success count value for a second value for the attribute for the indemnity clause. For instance, counterparty profile generator 212 may determine a primary value for the first entity, example, from a playbook associated with the first entity. Similarly, counterparty profile generator 212 may determine a first fallback value for the first entity, example, from the playbook associated with the first entity. In this instance, clause success estimator 238 may generate a first success count value for primary value for the indemnity clause attribute and a second success count value of the first fallback value for the indemnity clause attribute. In this example, counterparty profile generator 212 may generate a user interface that includes agreement rate information 502. Counterparty profile generator 212 may cause user device 108A to display the user interface that includes agreement rate information 502. As shown, counterparty profile generator 212 may indicate that the primary attribute for the first entity may have a lower number of executed contracts with the second entity than the first fallback attribute for the first entity. In the example of FIG. 5, the success count values are shown as a pie chart, but in other examples, the success count values may be shown in different charts (e.g., a plot or bar chart) and/or shown using text.

Counterparty profile generator 212 may generate the counterparty profile to indicate expected execution time for values of an attribute in a pending clause (illustrated as "Time to Sign") for a particular value for an attribute in a pending clause based on the success count value and the failure count value. For example, counterparty insight generator 240 may determine a first expected execution time for the primary value of the attribute in the indemnity clause. Similarly, counterparty insight generator 240 may generate a second expected execution time for the first fallback value for the attribute in the indemnity clause. Counterparty profile generator 212 may cause user device 108A to display the user interface that includes time to sign information 504. As shown, counterparty profile generator 212 may indicate that the primary attribute for the first entity may have a longer expected execution time with the second entity than the first fallback attribute for the first entity. In the example of FIG. 5, the expected execution values (illustrated as time to sign) are shown as a bar chart, but in other examples, the success count values may be shown in different charts (e.g., a plot or pie chart) and/or shown using text.

Figure 6:
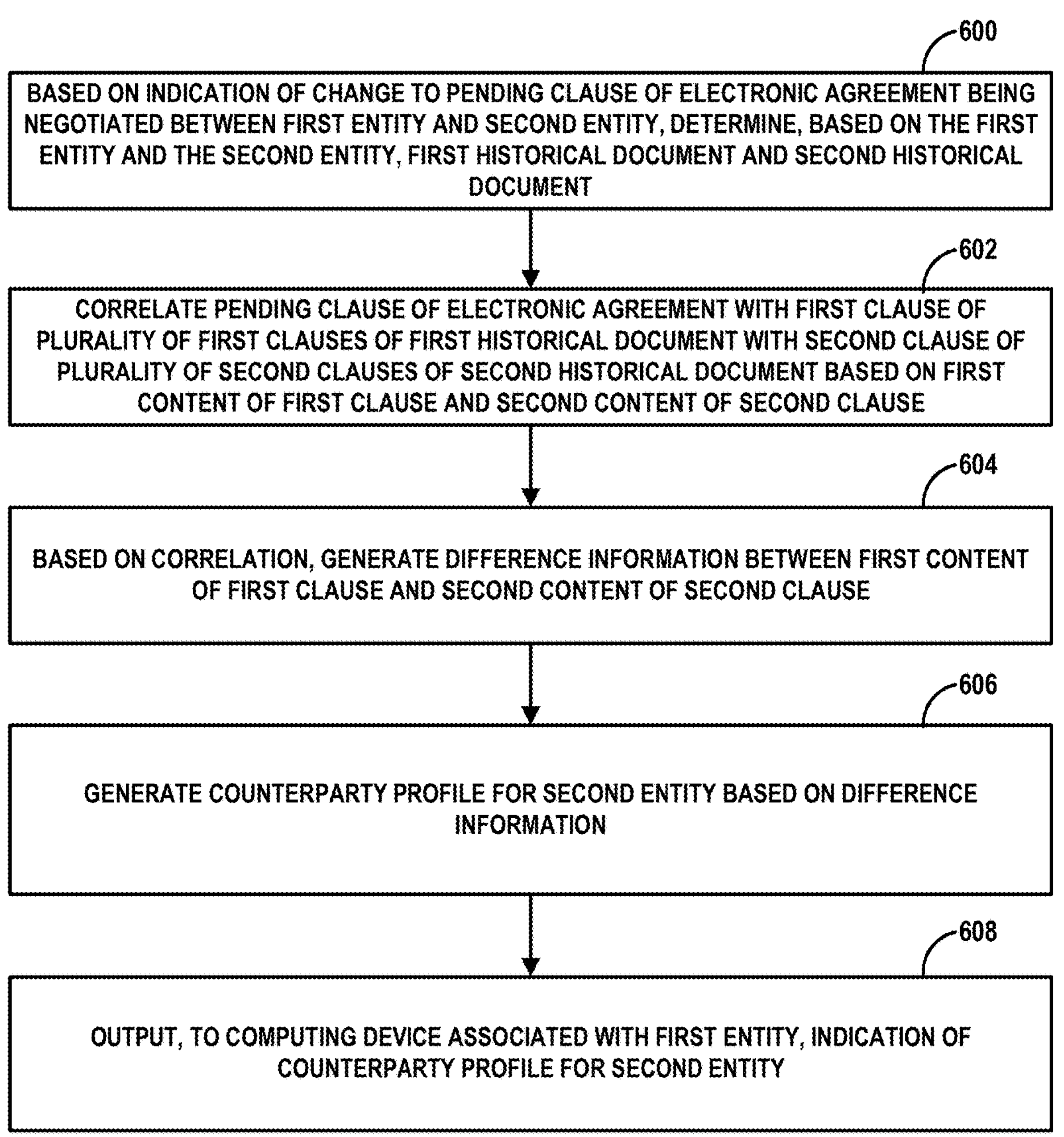
FIG. 6 is a flow chart illustrating an example process for generating a counterparty profile for an electronic agreement, in accordance with techniques of this disclosure.

FIG. 6 is a flow chart illustrating an example process for generating a counterparty profile for an electronic agreement, in accordance with techniques of this disclosure. FIG. 6 is discussed with reference to FIGS. 1-5 for example purposes only.

Based on an indication of a change to a pending clause of an electronic agreement being negotiated between a first entity and a second entity, clause correlator 232 may determine, based on the first entity and the second entity, a first historical document and a second historical document (600). In some examples, clause correlator 232 may determine, based on the second entity (e.g., and not the first entity), a first historical document and a second historical document. Clause correlator 232 may receive, from user device 108B associated with the second entity, the indication of the change to the pending clause of the electronic agreement. For example, clause correlator 232 may determine that the first entity corresponds to a party of the first historical document and the second entity corresponds to a counterparty of the first historical document. In this example, clause correlator 232 may determine that the first entity corresponds to the party of the second historical document and the second entity corresponds to the counterparty of the second historical document.

Clause correlator 232 may correlate the pending clause of the electronic agreement with a first clause of a plurality of first clauses of the first historical document and with a second clause of a plurality of second clauses of the second historical document based on first content of the first clause and second content of the second clause (602). For example, clause correlator 232 may determine a vector for the pending clause based on pending content of the pending clause. In this example, clause correlator 232 may determine that the pending clause correlates with the first clause based on the vector for the pending clause. For instance, clause correlator 232 may determine that the pending clause correlates with the first clause based on a determination that the vector for the pending clause is sufficiently similar to a vector for the first clause. Clause correlator 232 may determine that the pending clause correlates with the second clause based on the vector for the pending clause. For instance, clause correlator 232 may determine that the pending clause correlates with the first clause based on a determination that the vector for the pending clause is sufficiently similar to a vector for the second clause.

Based on the correlation, difference information generator 234 may generate difference information between the first content of the first clause and the second content of the second clause (604). Counterparty profile generator 212 may generate a counterparty profile for the second entity based on the difference information (606).

For example, based on a determination that the first historical document has been executed by the second entity and that the second historical document has been executed by the second entity, difference information generator 234 may generate summary information based on the first content of the first clause and the second content of the second clause. In this example, counterparty profile generator 212 may generate the counterparty profile to indicate the summary information.

Difference information generator 234 may generate count information for each value for an attribute of a pending claim. For example, based on a determination that the first historical document has been executed by the second entity and that the first content indicates a first value for an attribute for the pending clause, difference information generator 234 may determine a first success count value for the first value. Based on a determination that the second historical document has been executed by the second entity and that the second content indicates a second value for the attribute for the pending clause, difference information generator 234 may determine a second success count value for the second value. Based on a determination that the first success count value is greater than the second success count value, counterparty profile generator 212 may generate the counterparty profile to indicate that the first value is a standard value for the attribute and that the second value is a fallback value for the attribute. In some examples, counterparty profile generator 212 may generate the counterparty profile to suggest the first value for the attribute in the pending clause based on a determination that the first success count value is greater than the second success count value.

Counterparty profile generator 212 may generate a first expected execution time for the first value for the attribute based on a first execution time for the first historical document. In this example, counterparty profile generator 212 may generate a second expected execution time for the second value for the attribute based on a second execution time for the second historical document. Counterparty profile generator 212 may generate the counterparty profile to indicate the first expected execution time for the first value for the attribute and the second expected execution time for the second value for the attribute.

Difference information generator 234 may generate success and failure count information for each value for an attribute of a pending claim. Based on a determination that the first historical document has been executed by the second entity and that the first content indicates a particular value for an attribute for the pending clause, difference information generator 234 determine a success count value for the particular value. Based on a determination that the second historical document has been rejected by the second entity and that the second content indicates the particular value for the attribute for the pending clause, difference information generator 234 determine a failure count value for the particular value. Counterparty profile generator 212 may generate the counterparty profile to indicate a likelihood of success for the particular value based on the success count value and the failure count value. In some examples, counterparty profile generator 212 may generate the counterparty profile to suggest the particular value for the attribute in the pending clause based on the success count value and the failure count value.

Counterparty profile generator 212 may output, to a computing device associated with the first entity, an indication of the counterparty profile for the second entity (608). For example, counterparty profile generator 212 may generate data for a user interface for presentation of one or more of summary information of previous clauses for counterparty, a standard position (and optionally one or more fallback positions) of the counterparty for a pending clause, a count of each attribute value for an attribute of the pending clause, an acceptance rate or likelihood of success of each attribute value for an attribute of the pending clause, a suggested value for an attribute (e.g., a number of years in a warranty clause or a jurisdiction in a jurisdiction clause) of the counterparty for a pending clause, or an expected execution time for one or more values for the attribute. Counterparty profile generator 212 may cause a computing device to display the user interface. For example, counterparty profile generator 212 may output, to a computing device associated with the first entity, an indication of the counterparty profile for the second entity. For instance, counterparty profile generator 212 may output, to user device 108A associated with the first entity, an indication of the counterparty profile for the second entity associated with user device 108B.

In some examples, document management system 202 may select a particular value for the attribute in the pending clause based on the counterparty profile (e.g., automatically and/or based on user input data). For instance, document management system 202 may determine the particular value for the attribute as the standard value for the attribute indicated in the counterparty profile and/or as the value with the highest likelihood of success indicated in the counterparty profile that satisfies a playbook for the first entity. In some instances, document management system 202 may determine the particular value for the attribute based on a determination that user input data indicates the particular value. For instance, to output the indication of the counterparty profile, document management system 202 may cause user device 108A to generate user input data based on a user interaction with user device 108A (e.g., interacting with a touch screen and/or keyboard) and to determine whether the user input data indicates a confirmation (e.g., active confirmation and/or implied confirmation) of the particular value and/or a selection of the particular value. In this instance, user device 108A may output an indication of the user input data and document management system 202 may select the particular value for the attribute in the pending clause based on the indication of the user input data output by user device 108A.

Document management system 202 may generate an executed agreement based on the selected particular value for the attribute in the pending clause. For example, document management system 202 may generate an updated version of the electronic agreement that indicates the selected particular value for the attribute in the pending clause. Document management system 202 may output the updated version of the electronic agreement to user device 108B associated with the second entity. In this example, user device 108B indicates approval of the updated version of the electronic agreement by the second entity. In response to approval and/or when sending the updated version of the electronic agreement, document management system 202 may initiate an electronic execution (e.g., electronic signature) of the updated version of the electronic agreement to generate an executed agreement. In this way, document management system 202 may support generation of the executed electronic agreement that finalizes the negotiation between the first entity and the second entity (e.g., the counterparty), which improves the operation of document system 202 itself in the technical field of the field of electronic document generation and management.

Like reference characters denote like elements throughout the text and figures.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing an understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system for generating counterparty profiles for electronic agreements, the system comprising:

processing circuitry;

a historical documents database configured to store, for each historical document of a plurality of historical documents, content of one or more clauses of the respective historical document and metadata specifying a plurality of entities for the respective historical document;

a clause database configured to store vector embeddings for the plurality of historical documents, wherein a machine learning model is configured to generate the vector embeddings for the plurality of historical documents; and non-transitory computer-readable media comprising instructions that, when executed, cause the processing circuitry to:

based on an indication of a change to content of a pending clause of an electronic agreement associated with a first entity and a second entity, select, based on a determination that the metadata for a first historical document of the plurality of historical documents specifies the first entity and the second entity and the metadata for a second historical document of the plurality of historical documents specifies the first entity and the second entity, the first historical document and the second historical document from the plurality of historical documents;

based on the selection of the first historical document and the second historical document, retrieve, from the clause database, a first vector embedding for a first clause of the first historical document and a second vector embedding for a second clause of the second historical document;

generate, with the machine learning model and based on content of the pending clause with the change, a vector embedding for the pending clause;

select, based on the vector embedding for the pending clause with the change, the first vector embedding for the first clause of the first historical document, and the second vector embedding for the second clause of the second historical document, the first clause of the first historical document and the second clause of the second historical document;

based on the selection of the first clause of the first historical document and the second clause of the second historical document, determine that first content of the first clause of the first historical document indicates a first value for an attribute for the pending clause and determine that second content of the second clause of the second historical document indicates a second value for the attribute for the pending clause;

generate a first expected execution time for the first value for the attribute based on a first execution time for the first historical document;

generate a second expected execution time for the second value for the attribute based on a second execution time for the second historical document;

generate, based on the first expected execution time and the second expected execution time, a counterparty profile; and output an indication of the counterparty profile for the second entity.

2. The system of claim 1, wherein the instructions cause the processing circuitry to receive, from a computing device associated with the second entity, the indication of the change to the content of the pending clause of the electronic agreement.

3. The system of claim 1, wherein to select the first historical document and the second historical document, the instructions cause the processing circuitry to:

determine that the first entity corresponds to a party of the first historical document and the second entity corresponds to a counterparty of the first historical document; and determine that the first entity corresponds to the party of the second historical document and the second entity corresponds to the counterparty of the second historical document.

4. The system of claim 1, wherein the instructions further cause the processing circuitry to:

based on a determination that the first historical document has been executed by the second entity and that the second historical document has been executed by the second entity, generate summary information based on the first content of the first clause and the second content of the second clause, wherein the instructions cause the processing circuitry to generate the counterparty profile further based on the summary information.

5. The system of claim 1, wherein the instructions further cause the processing circuitry to:

based on a determination that the first historical document has been executed by the second entity and that the first content indicates the first value for the attribute for the pending clause, determine a first success count value for the first value; and based on a determination that the second historical document has been executed by the second entity and that the second content indicates the second value for the attribute for the pending clause, determine a second success count value for the second value, wherein the instructions cause the processing circuitry to generate the counterparty profile further based on the first success count value for the first value and the second success count value for the second value.

6. The system of claim 5, wherein to generate the counterparty profile, the instructions cause the processing circuitry to:

based on a determination that the first success count value is greater than the second success count value, generate the counterparty profile to indicate that the first value is a standard value for the attribute and that the second value is a fallback value for the attribute.

7. The system of claim 5, wherein to generate the counterparty profile, the instructions cause the processing circuitry to:

generate the counterparty profile to suggest the first value for the attribute in the pending clause based on a determination that the first success count value is greater than the second success count value.

8. The system of claim 1, wherein the instructions further cause the processing circuitry to:

based on a determination that the first historical document has been executed by the second entity and that the first content indicates the first value for the attribute for the pending clause, determine a success count value for the first value; and based on a determination that a third historical document of the plurality of historical documents has been rejected by the second entity and that third content of a third clause of the third historical document indicates the first value for the attribute for the pending clause, determine a failure count value for the first value.

9. The system of claim 8, wherein the instructions further cause the processing circuitry to:

determine, based on the success count value for the first value and the failure count value for the first value, a likelihood of success for the first value for the attribute for the pending clause, wherein the instructions cause the processing circuitry to generate the counterparty profile to indicate the likelihood of success for the first value for the attribute for the pending clause.

10. The system of claim 8, wherein to generate the counterparty profile, the instructions cause the processing circuitry to:

generate the counterparty profile to suggest the first value for the attribute in the pending clause based on the success count value and the failure count value.

11. The system of claim 1, wherein the instructions further cause the processing circuitry to:

select a particular value for the attribute for the pending clause based on the counterparty profile; and generate an executed agreement based on the selected particular value for the attribute in the pending clause.

12. A method for generating counterparty profiles for electronic agreements, the method comprising:

based on an indication of a change to content of a pending clause of an electronic agreement associated with a first entity and a second entity, selecting, by processing circuitry and based on determining that metadata for a first historical document of a plurality of historical documents specifies the first entity and the second entity and metadata for a second historical document of the plurality of historical documents specifies the first entity and the second entity, the first historical document and the second historical document from the plurality of historical documents, wherein a historical documents database is configured to store, for each historical document of the plurality of historical documents, content of one or more clauses of the respective historical document and metadata specifying a plurality of entities for the respective historical document;

based on selecting the first historical document and the second historical document, retrieving, by the processing circuitry and from a clause database configured to store vector embeddings for the plurality of historical documents, a first vector embedding for a first clause of the first historical document and a second vector embedding for a second clause of the second historical document, wherein a machine learning model is configured to generate the vector embeddings for the plurality of historical documents;

generating, by the processing circuitry, with the machine learning model, and based on content of the pending clause with the change, a vector embedding for the pending clause;

selecting, by the processing circuitry and based on the vector embedding for the pending clause with the change, the first vector embedding for the first clause of the first historical document, and the second vector embedding for the second clause of the second historical document, the first clause of the first historical document and the second clause of the second historical document;

based on selecting the first clause of the first historical document and the second clause of the second historical document, determining, by the processing circuitry, that first content of the first clause of the first historical document indicates a first value for an attribute for the pending clause and determining, by the processing circuitry, that second content of the second clause of the second historical document indicates a second value for the attribute for the pending clause;

generating, by the processing circuitry, a first expected execution time for the first value for the attribute based on a first execution time for the first historical document;

generating, by the processing circuitry, a second expected execution time for the second value for the attribute based on a second execution time for the second historical document;

generating, by the processing circuitry and based on the first expected execution time and the second expected execution time, a counterparty profile; and outputting, by the processing circuitry, an indication of the counterparty profile for the second entity.

13. The method of claim 12, further comprising receiving, by the processing circuitry and from a computing device associated with the second entity, the indication of the change to the content of the pending clause of the electronic agreement.

14. The method of claim 12, wherein selecting the first historical document and the second historical document comprises:

determining that the first entity corresponds to a party of the first historical document and the second entity corresponds to a counterparty of the first historical document; and determining that the first entity corresponds to the party of the second historical document and the second entity corresponds to the counterparty of the second historical document.

15. The method of claim 12, further comprising:

determining, by the processing circuitry, that the first historical document has been executed by the second entity and that the second historical document has been executed by the second entity; and based on determining that the first historical document has been executed by the second entity and that the second historical document has been executed by the second entity, generating, by the processing circuitry, summary information based on the first content of the first clause and the second content of the second clause, wherein generating the counterparty profile is further based on the summary information.

16. The method of claim 12, further comprising:

determining, by the processing circuitry, that the first historical document has been executed by the second entity and that the second historical document has been executed by the second entity;

based on determining that the first historical document has been executed by the second entity and that the first content indicates the first value for an attribute for the pending clause, determining a first success count value for the first value; and based on determining that the second historical document has been executed by the second entity and that the second content indicates the second value for the attribute for the pending clause, determining a second success count value for the second value, wherein generating the counterparty profile is further based on the first success count value for the first value and the second success count value for the second value.

17. The method of claim 16, wherein generating the counterparty profile comprises:

determining that the first success count value is greater than the second success count value; and based on determining that the first success count value is greater than the second success count value, generating the counterparty profile to indicate that the first value is a standard value for the attribute and that the second value is a fallback value for the attribute.

18. The method of claim 16, wherein generating the counterparty profile comprises:

generating the counterparty profile to suggest the first value for the attribute in the pending clause based on a determination that the first success count value is greater than the second success count value.

19. The method of claim 12, further comprising:

determining, by the processing circuitry, that the first historical document has been executed by the second entity;

based on determining that the first historical document has been executed by the second entity and that the first content indicates the first value for the attribute for the pending clause, determining, by the processing circuitry, a success count value for the first value;

determining, by the processing circuitry, that a third historical document of the plurality of historical documents has been rejected by the second entity and that third content of a third clause of the third historical document indicates the first value for the attribute for the pending clause; and based on determining that the third historical document has been rejected by the second entity and that the third content of the third clause of the third historical document indicates the first value for the attribute for the pending clause, determining a failure count value for the first value.

20. Non-transitory computer-readable media encoded with instructions that, when executed by processing circuitry, cause the processing circuitry to:

based on an indication of a change to content of a pending clause of an electronic agreement associated with a first entity and a second entity, select, based on a determination that metadata for a first historical document of a plurality of historical documents specifies the first entity and the second entity and metadata for a second historical document of the plurality of historical documents specifies the first entity and the second entity, the first historical document and the second historical document from the plurality of historical documents, wherein a historical documents database is configured to store, for each historical document of the plurality of historical documents, content of one or more clauses of the respective historical document and metadata specifying a plurality of entities for the respective historical document;

based on a selection of the first historical document and the second historical document, retrieve, from a clause database configured to store vector embeddings for the plurality of historical documents, a first vector embedding for a first clause of the first historical document and a second vector embedding for a second clause of the second historical document, wherein a machine learning model is configured to generate the vector embeddings for the plurality of historical documents;

generate, with the machine learning model and based on content of the pending clause with the change, a vector embedding for the pending clause;

select, based on the vector embedding for the pending clause with the change, the first vector embedding for the first clause of the first historical document, and the second vector embedding for the second clause of the second historical document, the first clause of the first historical document and the second clause of the second historical document;

based on the selection of the first clause of the first historical document and the second clause of the second historical document, determine that first content of the first clause of the first historical document indicates a first value for an attribute for the pending clause and determine that second content of the second clause of the second historical document indicates a second value for the attribute for the pending clause;

generate a first expected execution time for the first value for the attribute based on a first execution time for the first historical document;

generate a second expected execution time for the second value for the attribute based on a second execution time for the second historical document;

generate, based on the first expected execution time and the second expected execution time, a counterparty profile; and output an indication of the counterparty profile for the second entity.

* * * * *